US009473961B2

(12) United States Patent
Chen et al.

(10) Patent No.: US 9,473,961 B2
(45) Date of Patent: Oct. 18, 2016

(54) METHOD AND APPARATUS FOR HANDLING ADDRESS CONFLICT

(71) Applicant: Huawei Device Co., Ltd., Shenzhen (CN)

(72) Inventors: Ji Chen, Shenzhen (CN); Zhiming Ding, Shenzhen (CN); Guiming Shu, Shenzhen (CN); Yunbo Li, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 207 days.

(21) Appl. No.: 14/341,990

(22) Filed: Jul. 28, 2014

(65) Prior Publication Data

US 2014/0334287 A1 Nov. 13, 2014

Related U.S. Application Data

(63) Continuation of application No. PCT/CN2013/070387, filed on Jan. 11, 2013.

(30) Foreign Application Priority Data

Feb. 17, 2012 (CN) .......................... 2012 1 0037316

(51) Int. Cl.
H04W 24/04 (2009.01)
H04L 29/06 (2006.01)
H04L 29/12 (2006.01)

(52) U.S. Cl.
CPC .......... *H04W 24/04* (2013.01); *H04L 61/2046* (2013.01); *H04L 61/6022* (2013.01); *H04L 61/2038* (2013.01); *H04L 61/6072* (2013.01); *H04L 69/04* (2013.01); *H04L 69/22* (2013.01)

(58) Field of Classification Search
CPC ..... H04W 72/08; H04W 28/06; H04W 8/26; H04W 84/12; H04W 48/08; H04W 72/0446; H04W 72/1247; H04W 74/0875; H04L 27/2613; H04L 27/2602; H04L 5/0053; H04L 5/0091; H04L 27/0006; H04L 61/2038; H04L 41/021; H04J 2203/0091
See application file for complete search history.

(56) References Cited

U.S. PATENT DOCUMENTS 6,697,873 B1    2/2004  Yik et al.
2009/0265455 A1* 10/2009  Hiraki ................ H04L 61/2038
                                                709/223

(Continued)

FOREIGN PATENT DOCUMENTS

CN    1564989 A    1/2005
CN    101207545 A    6/2008

(Continued)

OTHER PUBLICATIONS

Foreign Communication From a Counterpart Application, Chinese Application No. 201210037316.9, Chinese Search Report dated Jun. 19, 2015, 2 pages.
Foreign Communication From a Counterpart Application, Chinese Application No. 201210037316.9, Chinese Office Action dated Jun. 30, 2015, 7 pages.
"Part 11: Wireless Lan Medium Access Control (MAC) and Physical Layer (PHY) Specifications," IEE Computer Society, 802.11, Jun. 12, 2007, 1232 pages.
Foreign Communication From a Counterpart Application, PCT Application No. PCT/CN2013/070387, English Translation of International Search Report dated Apr. 11, 2013, 2 pages.

(Continued)

*Primary Examiner* — Jung-Jen Liu
(74) *Attorney, Agent, or Firm* — Conley Rose, P.C.; Grant Rodolph

(57) ABSTRACT

A method and an apparatus for handling an address conflict. The method for handling an address conflict includes: acquiring a media access control (MAC) address of an associated first node and a first auxiliary identifier; receiving a MAC frame that carries the first auxiliary identifier; and sending an auxiliary identifier conflict report message to the first node when it is determined that the MAC frame is sent by a second node. According to the method and the apparatus for handling an address conflict in the embodiments of the present invention, the following problem can be detected and resolved. An AP auxiliary identifier conflict is caused by a MAC header compression method where an auxiliary identifier is used to replace a MAC address.

26 Claims, 2 Drawing Sheets

(56) References Cited

U.S. PATENT DOCUMENTS

| | | |
|---|---|---|
| 2009/0279518 A1 | 11/2009 | Falk et al. |
| 2010/0008235 A1* | 1/2010 | Tinnakornsrisuphap .. H04L 29/12264 370/241 |
| 2013/0044607 A1* | 2/2013 | Liu ........................ H04W 8/26 370/242 |

FOREIGN PATENT DOCUMENTS

| | | |
|---|---|---|
| CN | 101291350 A | 10/2008 |
| CN | 101344985 A | 1/2009 |
| CN | 101507235 A | 8/2009 |
| CN | 102090098 A | 6/2011 |
| CN | 102137413 A | 7/2011 |
| CN | 103209045 A | 7/2013 |
| EP | 2793448 A1 | 10/2014 |
| WO | 2009156777 A1 | 12/2009 |

OTHER PUBLICATIONS

Foreign Communication From a Counterpart Application, PCT Application No. PCT/CN2013/070387, English Translation of Written Opinion dated Apr. 11, 2013, 7 pages.

Foreign Communication From a Counterpart Application, Chinese Application No. 201210037316.9, Chinese Search Report dated Feb. 24, 2016, 2 pages.

Foreign Communication From a Counterpart Application, Chinese Application No. 201210037316.9, Chinese Office Action dated Mar. 4, 2016, 3 pages.

* cited by examiner

METHOD AND APPARATUS FOR HANDLING ADDRESS CONFLICT

CROSS-REFERENCE TO RELATED APPLICATIONS

This application is a continuation of International Application No. PCT/CN2013/070387, filed on Jan. 11, 2013 which claims priority to Chinese Patent Application No. 201210037316.9, filed on Feb. 17, 2012, all of which are hereby incorporated by reference in their entireties.

TECHNICAL FIELD

The present invention relates to the communications field, and in particular, to a method and an apparatus for handling an address conflict.

BACKGROUND

Since 1997 when the wireless local area network standard Institute of Electrical and Electronics Engineers (IEEE) 802.11 was released, and under a vigorous promotion by the Wireless Fidelity (WiFi) Alliance formed by numerous leading companies in the industry, the WiFi technology has been developing rapidly due to its advantages, such as rapid deployment, convenient use, and a high transmission rate. Because mobile terminal devices nowadays, such as a notebook computer, a personal digital assistant (PDA), and a cell phone, all support the WiFi technology and users have a requirement of mobile working, the WiFi technology is widely applied to various industries. WiFi network access points are distributed throughout locations such as a hotel, a cafe, a school, and a hospital. It may be said that, WiFi is everywhere in life.

Generally speaking, a characteristic of a WiFi network is that one Access Point (AP) provides an access service for a plurality of stations (STAs). The AP and STAs perform information interaction using a wireless signal. From a perspective of a Media Access Control (MAC) layer, a unit of the information interaction between the AP and the STAs is a frame. That is, the AP sends one or more frames to the STAs, and alternately, the STAs also send one or more frames to the AP. These frames have a specific structure: a former part of a frame is a frame header, which may also be referred to as a MAC header; and a latter part of a frame is used for carrying a data section. For each type of frame, a structure of the MAC header is relatively fixed, and a length is also relatively fixed. However, a length of the data section varies with an actual situation.

For a transmission requirement, the MAC header carries a destination address and a source address. The destination address is used to represent to whom this frame is sent, that is, a frame receiver; and the source address is used to represent from whom this frame is sent, that is, a frame transmitter. In the existing wireless local area network standard IEEE 802.11, the destination address and the source address are a MAC address of a target device and a MAC address of a source device respectively, and they both have 48 bits. In the existing IEEE 802.11 standard, the MAC frame header may actually involve a maximum of four addresses, which respectively represent a source address, an address of a current transmitter, an address of a current receiver, and an ultimate target address. The source address mentioned in the specification refers to the current transmitter address in the standard, which may be the same as the source address. The destination address mentioned in the specification refers to the current receiver address in the standard, which may be the same as the ultimate target address.

An AP of a WiFi broadcasts a beacon (beacon frame) frame periodically. The beacon frame carries various network information of the AP, for example, information such as a name of the network, a MAC address of the AP, and a period of the beacon frame. An STA may learn the network information by monitoring the beacon frame.

In addition, the WiFi standard IEEE 802.11ah mainly applies to fields of a smart grid, a sensor network, and the like. Data transmission of the WiFi standard IEEE 802.11ah is characterized in a low transmission rate and a small amount of data transmitted each time. Because a MAC header is carried in transmitted data during each transmission process, if the amount of the transmitted data is not large, a proportion occupied by the MAC header is obvious. Therefore, compression of the MAC header is considered. A specific implementation method is to compress an original 48-bit MAC address into a 16-bit STA identification number or an auxiliary identifier (AID) and/or an AP identification number or an auxiliary identifier (APID). These shorter identification numbers may be referred to as auxiliary identifiers and be used as addresses shorter than the MAC. In this way, a downlink destination address may be indicated using an AID, and a source address may be indicated using an APID; and an uplink destination address may be indicated using an APID, and a source address may be indicated using an AID. Generally speaking, an AID is an STA identification number allocated by an AP and has 16 bits; and an APID is an identification number generated using a certain method to identify an AP and also has 16 bits. The method for generating an APID, for example, may be to obtain a 16-bit identification number from a 48-bit MAC address of an AP after hash calculation. Therefore, it may be seen that, after compression of a MAC header, when an AP communicates with an STA, addresses of the AP and STA are no longer identified using the respective MAC addresses but are identified using an APID and an AID respectively.

Generally speaking, for a beacon frame, an association response frame, a re-association response frame, or an auxiliary identifier update frame sent by an AP, a frame header includes a MAC address of the AP, and a frame body includes an APID of the AP. However, for other data frames or management frames, in a transmission manner using MAC header compression, source addresses and destination addresses in frame headers of these data frames or management frames are all identified by AID/APID.

However, there is a possibility of an address conflict in an actual application of identification using an APID and an AID after MAC header compression. For example, APIDs of two adjacent APs may be the same (for example, when 100 APs coexist, a possibility of occurrence of same APIDs is 7%). Uplink data sent to one of the APs by an STA may be received by the other AP, and the other AP mistakenly assumes that the uplink data is sent to the other AP itself; or an STA is waiting to receive downlink data from one of the APs, but receives downlink data sent by the other AP and therefore mistakenly assumes that the downlink data is sent to the STA itself. This may cause unnecessary trouble. For example, after receiving data and performing some decoding operations, the AP or STA finds that the data is not sent to the AP or STA itself, and then needs to discard the received data, thereby exercising in futility.

SUMMARY

Embodiments of the present invention propose a method and an apparatus for handling an address conflict, and is aimed at handling a problem of an AP auxiliary identifier conflict caused by a MAC header compression method where an auxiliary identifier is used to replace a MAC address. In the following, an AP auxiliary identifier is referred to as an APID for short, and an STA auxiliary identifier is referred to an AID for short.

According to one aspect, a method for handling an address conflict is provided, including: acquiring a MAC address of an associated first node and a first auxiliary identifier; receiving a MAC frame that carries the first auxiliary identifier; and sending an auxiliary identifier conflict report message to the first node when it is determined that the MAC frame is sent by a second node.

According to another aspect, a method for handling an address conflict is provided, including: receiving a MAC frame, where a destination address of the MAC frame is represented by a third auxiliary identifier, and the third auxiliary identifier is used to communicate with an associated third node; and determining, based on the MAC frame, that a fourth node whose auxiliary identifier is the third auxiliary identifier exists, changing the third auxiliary identifier to a fourth auxiliary identifier, and informing the third node of the fourth auxiliary identifier.

According to still another aspect, an apparatus for handling an address conflict is provided, including: an acquiring unit configured to acquire a MAC address of an associated first node and a first auxiliary identifier; a first receiving unit configured to receive a MAC frame that carries the first auxiliary identifier; and a first sending unit configured to send an auxiliary identifier conflict report message to the first node if the MAC frame is sent by a second node.

According to yet another aspect, an apparatus for handling an address conflict is provided, including: a second receiving unit configured to receive a MAC frame, where a destination address of the MAC frame is represented by a third auxiliary identifier, and the third auxiliary identifier is used to communicate with an associated third node; and an updating unit configured to determine, based on the MAC frame, that a fourth node whose auxiliary identifier is the third auxiliary identifier exists, change the third auxiliary identifier to a fourth auxiliary identifier, and inform the third node of the fourth auxiliary identifier.

According to the methods and apparatuses for handling an address conflict in the embodiments of the present invention, the following problem can be detected and resolved. An AP auxiliary identifier (APID) conflict is caused by a MAC header compression method where an auxiliary identifier is used to replace a MAC address.

BRIEF DESCRIPTION OF DRAWINGS

To describe the technical solutions in the embodiments of the present invention more clearly, the following briefly introduces the accompanying drawings required for describing the embodiments of the present invention. The accompanying drawings in the following description show merely some embodiments of the present invention, and a person of ordinary skill in the art may still derive other drawings from these accompanying drawings without creative efforts.

DESCRIPTION OF EMBODIMENTS

The following clearly and fully describes the technical solutions in the embodiments of the present invention with reference to the accompanying drawings in the embodiments of the present invention. The described embodiments are a part rather than all of the embodiments of the present invention. All other embodiments obtained by a person of ordinary skill in the art based on the embodiments of the present invention without creative efforts shall fall within the protection scope of the present invention.

Figure 1:
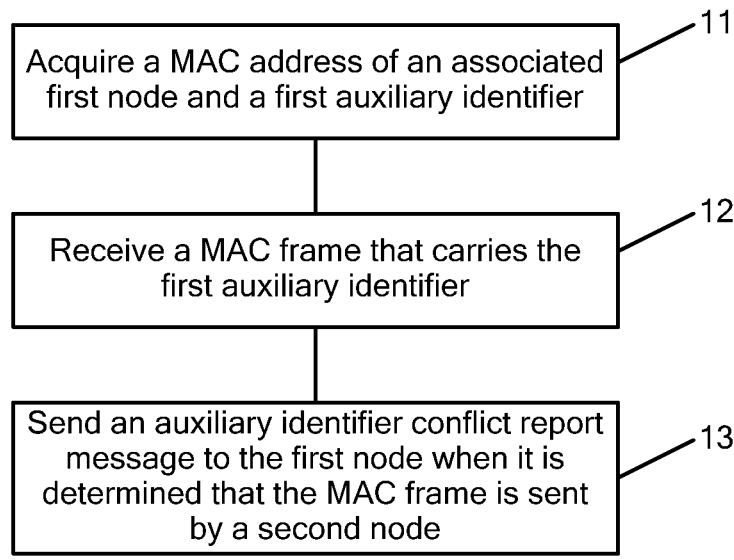
FIG. 1 is a flowchart of a method for handling an address conflict according to an embodiment of the present invention.

The following describes a method for handling an address conflict in detail according to an embodiment of the present invention with reference to FIG. 1. The address conflict described herein is caused by a MAC header compression method where an AP auxiliary identifier is used to replace a MAC address.

11: An SAT1 acquires a MAC address of a first node (hereinafter referred to as AP1) associated with the STA1 and a first AP auxiliary identifier (hereinafter represented by APID1).

Generally speaking, the STA1 can obtain the MAC address of the AP1 and the APID1 when establishing an association with the AP1.

Alternatively, before establishing the association with the AP1, the STA1 may receive a beacon frame or a probe response frame sent by the AP1, where a frame header of the beacon frame or the probe response frame includes the MAC address of the AP1, and a data section of the beacon frame or the probe response frame includes the APID1.

Alternatively, after sending an association request frame to the AP1, the STA1 may receive an association response frame sent by the AP1, where a frame header of the association response frame includes the MAC address of the AP1, and a data section of the association response frame includes the APID1.

Generally, there is a plurality of APs on a wireless communications network, and each AP establishes an association with one or more STAs for communication. During a process that an AP communicates with an STA, a source address and a destination address identify a transmitter and a receiver respectively. The AP or the STA determines whether information is sent to the AP or the STA itself by resolving an obtained destination address. In a MAC header compression method, because an APID and an AID are used to replace a source address and a destination address that are identified by the MAC address, if adjacent APs have the same APIDs after the MAC header compression method is used, a plurality of the same APIDs is generated on the wireless communications network, thereby causing communication disorder. It is assumed that an AP2 and the AP1 have the same APID1, and it may be seen that the STA1 associated with the AP1 may mistakenly receive content sent by the AP2.

12: The STA1 receives a MAC frame that carries the APID1.

The MAC frame received by the STA1 may be from the AP1 and may also be from the AP2. However, a source address of the MAC frame is the APID1, that is, the source address indicates an address of a transmitter of the MAC frame.

13: When finding that the received MAC frame is sent by the AP2, the STA1 sends an auxiliary identifier conflict report message to the AP1.

If the MAC frame received by the STA1 is a beacon frame or a probe response frame, because the beacon frame or the probe response frame carries the APID and a source MAC address of the AP sending the MAC frame, if the source MAC address in a frame header section of the beacon frame or the probe response frame sent by the STA1 is different from the MAC address of the AP1, it is determined that the beacon frame or the probe response frame is sent by the AP2. Therefore, it is necessary to send the auxiliary identifier conflict report message to the AP1.

Alternatively, if the MAC frame received by the STA1 is a protected frame (such as a data frame or a management frame), a source address of the protected frame is represented by the APID1. Because the protected frame has a Message Integrity Code or frame message integrity code (collectively, MIC), if the STA finds that the MIC is incorrect after calculation, it is determined that the MAC frame is sent by the AP2. Therefore, it is also necessary to send the auxiliary identifier conflict report message to the AP1.

The MIC is generally data obtained by the transmitter after performing a specific operation on all content to be sent. Generally speaking, if the content to be sent changes, a value of the MIC changes; therefore, the MIC may be used to protect integrity of data.

Therefore, when receiving a message sent by the transmitter, the receiver calculates a value of the MIC of the received content using a same method. If the value of the MIC obtained by the calculation is consistent with the value of the received MIC, it means that the received data is complete and correct. Otherwise, it means that the data is incomplete or a part of the data is incorrect.

The MIC is obtained by performing an operation on a part of a Pairwise Transient Key (PTK), where the PTK is generated during a process of establishing the association between the STA and the AP; therefore, the PTK carries specific information between the STA and the AP. That is, for a specific association between the STA and the AP, the value of the MIC is unique. When a security measure is taken to transmit data frames between the STA and the AP, the MIC is carried in all the data frames. Therefore, the STA or the AP may know whether a data frame is sent to the STA or the AP itself by checking correctness of a MIC carried by a received data frame.

In addition, after sending the auxiliary identifier conflict report message to the AP1, the STA1 waits to receive a beacon frame, an association response frame, a re-association response frame, or an auxiliary identifier update frame that carries an APID2 (different from the APID1) and is sent by the AP1, acquires the APID2, and replaces the APID1 with the APID2.

It may be seen that, according to the method for handling an address conflict in this embodiment of the present invention, the following problem can be detected and resolved. An AP auxiliary identifier conflict is caused by a MAC header compression method where an auxiliary identifier is used to replace a MAC address.

The following describes the foregoing method for handling an address conflict according to an embodiment of the present invention with reference to a specific embodiment.

Specifically, the AP1 periodically sends a beacon frame, where the beacon frame carries the MAC address of the AP1 and a 16-bit APID1. In the beacon frame, a frame header includes the MAC address of the AP1, whereas the APID1 is included in a frame body and is carried in a manner of an information element. The AP2 also periodically sends a beacon frame, where the beacon frame carries the MAC address of the AP2 and the 16-bit APID1.

It is assumed that the AP1 and the AP2 do not discover each other. The STA1 has already associated with the AP1 and communicates with the AP1 using the APID1. That is, a destination address of uplink data of the STA1 is the APID1, and a source address is the AID1 of the STA1; and a destination address of downlink data is the AID1 of the STA1, and a source address is the APID1. The AID and the APID herein are both fields belonging to a frame header, which replace an original MAC address, so as to make the MAC frame shorter, thereby improving a channel utilization rate.

When the STA1 is in a coverage overlap area of the AP1 and the AP2, while receiving a beacon frame of the AP1, the STA1 may also receive a beacon frame of the AP2. Therefore, the STA1 finds that the APID of the AP2 and the APID of the AP1 are the same and knows that APIDs of two APs conflict. Because the STA1 cannot learn which AP the received beacon frame is from using the APID, the STA1 needs to use the MAC address of the transmitter AP carried by the beacon frame to locate the AP.

Then the STA1 reports to the AP1 detection of an APID conflict as well as all the APIDs discovered by the STA1 in a period. The STA1 reports all the APIDs discovered by the STA1 in a period to enable the AP1 to know which APIDs have been used, so that these used APIDs may be avoided when replacing a new APID subsequently. Here, "in a period" may be a scheduled time period, for example, 5 minutes, 10 minutes, or the like. That is, when detecting and reporting the APID conflict, the STA1 also reports to the AP1 all the APIDs that are discovered within 5 minutes or 10 minutes before the detection of the conflict as well as the time when each APID is discovered.

The AP1 determines that an APID conflict occurs according to the received APID conflict report message or according to content indicated in the received APID conflict report message.

Then, starting from a next beacon frame, the AP1 carries a new APID in a to-be-sent beacon frame, for example, the APID2, or the AP1 informs the STA1 of use of the new APID2 in time using a specific broadcast frame (hereinafter referred to as an auxiliary identifier update frame). When the STA1 monitors that the beacon frame carries the new APID2 or that the received auxiliary identifier update frame informs the STA1 of the change to the new APID2, the STA1 learns that the APID of the AP1 has already changed, and uses the new APID2 in subsequent communication.

After the AP1 informs the STA1 of the new APID2, if the APID conflict report (that is, the auxiliary identifier conflict report message) is still received in a certain period, or the APID conflict report is still received in a certain period after the APID is changed for specific times, the AP1 cancels a transmission manner (that is, an AID/APID manner) using the MAC header compression mode, and returns to a transmission manner where a MAC address is used.

It should be noted that, if merely the beacon frame is used to carry the new APID, and the auxiliary identifier update frame is not used to inform the STA1 of the new APID immediately, during a period of the AP1 receives the APID conflict report to the time when the next beacon frame is sent, other STAs associated with the AP1 still do not know that the new APID2 is needed to be changed, so other STAs still use the old APID1 for communication. Then during this period, the AP1 and the AP2 may still receive data frames sent to the old APID1; therefore, MIC may be used to check and determine whether the received frames are usable. For example, if the MIC is correct, the foregoing data frames are received and used; and if the MIC is incorrect, the foregoing data frames are discarded. Because a period of the beacon frame is relatively short, which is generally about 100 milliseconds (ms), receiving and discarding of data frames with an incorrect MIC in this period does not have a great impact.

The following method may be used to obtain how to detect an APID conflict using the MIC. The STA1, the AP1, and the AP2 are still used as an example. The APIDs of the AP1 and the AP2 are the same, for example, they are both the APID1, and the AP1 and the AP2 do not discover each other. The STA1 has already associated with the AP1, and communicates with the AP1 using the APID1.

The STA1 is in the coverage overlap area of the AP1 and the AP2, and the STA1 receives a downlink data frame from the AP2 with an AID as a receiver address and the APID1 as a transmitter address. The STA1 removes an MIC1 in the downlink data from the AP1 or the AP2 and, based on the remaining data and association information of the STA1 and AP1, recalculates an MIC2. If the recalculated MIC2 is the same as the MIC1 in the downlink data frame, it means that the MIC is correct, that is, the downlink data is from the AP1; and if the recalculated MIC2 is different from the MIC1 in the downlink data frame, it means that the MIC is incorrect, that is, the downlink data frame is not from the AP1. When finding that the MIC is incorrect, the STA1 discards the received downlink data frame.

After a certain period, if the STA1 still receives downlink data frames with an incorrect MIC, the STA1 reports information about the incorrect MIC to the AP1. Then the AP1 updates the APID and informs the STA1 of the new APID2 using a beacon frame or an auxiliary identifier update frame.

After the AP1 updates the APID, if the STA1 still continuously receives downlink data frames with an incorrect MIC in a certain period, the AP1 cancels the transmission manner (that is, the AID/APID manner) using the MAC header compression mode, and returns to the transmission manner where a MAC address is used.

According to the method for handling an address conflict in this embodiment of the present invention, the following problem can be detected and resolved. An AP auxiliary identifier conflict is caused by a MAC header compression method where an auxiliary identifier is used to replace a MAC address. Therefore, smooth implementation of the MAC header compression method is ensured, thereby reducing a MAC header length and improving a channel utilization rate.

Figure 2:
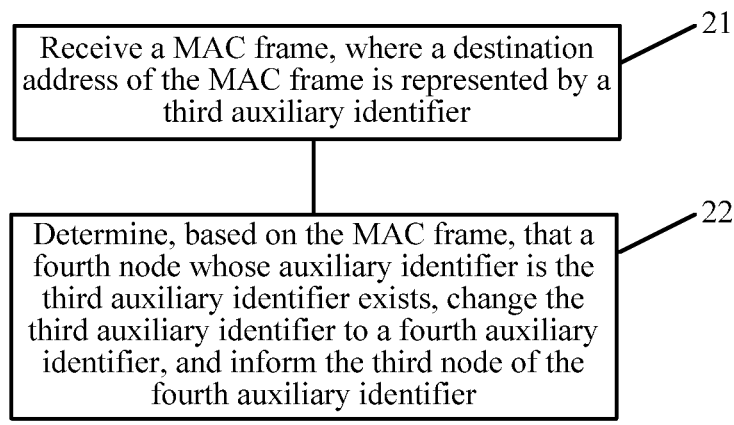
FIG. 2 is a flowchart of a method for handling an address conflict according to an embodiment of the present invention.

The foregoing is a description of a method for detecting and resolving an APID conflict by an STA. The following describes a method for detecting and resolving an APID conflict by an AP with reference to FIG. 2.

21: An AP3 receives a MAC frame, where a destination address of the MAC frame is represented by a third auxiliary identifier (hereinafter referred to as APID3), and the APID3 is used by the AP3 for communication with an associated third node (hereinafter referred to as STA2). The destination address of each of the MAC frame is the APID3, that is, the destination address indicates an address of a receiver of the MAC frame.

Generally, the AP3 may send a beacon frame or a probe response frame that carries the APID3, where the APID3 is included in a data section of the beacon frame or the probe response frame; or the AP3 sends a protected frame (such as a data frame or a management frame) carrying the APID3, where the protected frame has a frame message integrity code (MIC), and the APID3 is included in a frame header section of the protected frame and represents a source address of the protected frame.

Optionally, before associating with the STA2, the AP3 may also send a MAC frame that carries the APID3; or after receiving an association request frame or a re-association request frame sent by the STA2, the AP3 sends an association response frame or a re-association response frame that carries the APID3.

Similarly, there is a plurality of APs on a wireless communications network, and each AP associates with one or more STAs for communication. During a process that an AP communicates with an STA, a source address and a destination address identify a transmitter and a receiver respectively. The AP or the STA determines whether information is sent to the AP or the STA itself by resolving an obtained destination address. In a MAC header compression method, because an APID and an AID are used to replace a source address and a destination address that are identified by MAC address, if adjacent APs have the same APIDs after the MAC header compression method is used, a plurality of same APIDs is generated on the wireless communications network, thereby causing communication disorder. It is assumed that the AP3 and an AP4 have the same APID3, and it may be seen that the AP3 may mistakenly receive content sent by an STA3 that associates with the AP4.

However, because the destination address is identified by the APID3, the MAC frame may be from the STA2 and may also be from the STA3.

22: The AP3 determines, based on the received MAC frame, that a fourth node (hereinafter referred to as AP4) whose auxiliary identifier is the APID3 exists, changes the APID3 to a fourth auxiliary identifier (hereinafter referred to as APID4), and informs the STA2 of the APID4.

For example, the AP3 receives a protected frame whose destination address is the APID3, and the protected frame has an MIC. If the AP3 finds, by calculation, that the MIC is incorrect, the AP3 determines that the AP4 whose auxiliary identifier is the APID3 exists. Then the AP3 changes the APID3 to the APID4, and informs the STA2 of the APID4 using a beacon frame or an auxiliary identifier update frame.

Alternatively, the AP3 receives an auxiliary identifier conflict report message whose destination address is the APID3, and determines, based on the auxiliary identifier conflict report message, that the AP4 whose auxiliary identifier is the APID3 exists. Then the AP3 changes the APID3 to the APID4, and informs the STA2 of the APID4 using a beacon frame or an auxiliary identifier update frame.

It may be seen that, according to the method for handling an address conflict in this embodiment of the present invention, the following problem can be detected and resolved. An AP auxiliary identifier conflict is caused by a MAC header compression method where an auxiliary identifier is used to replace a MAC address.

Specifically, the APIDs of the AP3 and the AP4 are the same, for example, they are both the APID3, and the AP3 and the AP4 do not discover each other. The STA2 associates with the AP3 and communicates with the AP3 using the APID3. The STA3 associates with the AP4 and communicates with the AP4 using the APID3. That is, a destination address of uplink data of the STA2 is the APID3, and a source address is an AID2; or a destination address of downlink data is an AID2, and a source address is the APID3. A destination address of uplink data of the STA3 is the APID3, and a source address is an AID3; or a destination address of downlink data is an AID3, and a source address is the APID3. The AID2, APID2, AID3, and APID3 herein are all fields belonging to a frame header, which replace an original MAC address, so as to make the MAC frame shorter, improving a channel utilization rate.

The STA2 uses the APID3 to send an uplink data frame to the AP3. Because an uplink range of the STA2 covers the AP4, the AP4 also receives the uplink data frame of the STA2. Because the APID of the AP4 is the same as the APID of the AP3, the AP4 decodes the received uplink data frame. Because a value of an MIC calculated by the AP4 is incorrect, the AP4 discards the received uplink data frame.

Alternatively, the STA3 uses the APID3 to send an uplink data frame to the AP4. Because an uplink range of the STA3 covers the AP3, the AP3 also receives the uplink data frame of the STA3. Because the APID of the AP3 is the same as the APID of the AP4, the AP3 decodes the received uplink data frame. Because a value of an MIC calculated by the AP3 is incorrect, the AP3 discards the received uplink data frame.

After a certain period, if the AP3 still continuously receives data frames with an incorrect MIC, the AP3 updates the APID and informs the STA2 of the new APID4 using a beacon frame or an auxiliary identifier update frame. Similarly, the AP4 may also perform the foregoing update operation.

After the AP3 updates the APID, if the AP3 still continuously receives data frames with an incorrect MIC in a certain period, the AP3 cancels a transmission manner (that is, an AID/APID manner) using the MAC header compression mode and returns to a transmission manner where a MAC address is used. The AP4 may also perform the foregoing similar operation.

In existing WiFi transmission, not all data frames have an MIC. In the existing standard IEEE 802.11, which is used as an example, only an encrypted data frame has an MIC. Therefore, for an unencrypted data frame, the transmission manner using a compression mode, where an APID is used in a MAC header, is not used to transmit data.

In addition, because two APs may receive a beacon frame from each other, the APs may also know an APID of each other. If an address conflict is detected, the APID may be updated. That is, because an AP may monitor a beacon frame sent by another AP, when the AP is in a coverage area of the another AP, it may monitor a beacon frame of the another AP. Once the AP finds that there is another AP having a same APID as its own, the AP updates the APID according to a certain rule, for example, the AP with a smaller MAC address updates the APID. Then the AP broadcasts a new APID using a beacon frame.

According to the method for handling an address conflict in this embodiment of the present invention, the following problem can be detected and resolved. An AP auxiliary identifier conflict is caused by a MAC header compression method where an auxiliary identifier is used to replace a MAC address. Therefore, smooth implementation of the MAC header compression method is ensured, thereby reducing a MAC header length and improving a channel utilization rate.

Figure 3:
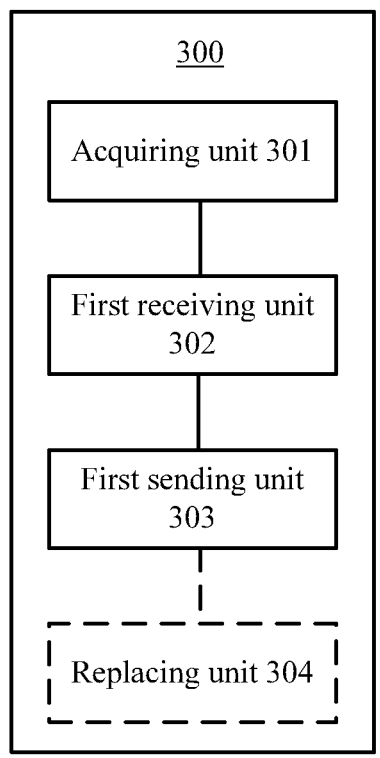
FIG. 3 is a schematic structural diagram of an apparatus for handling an address conflict according to an embodiment of the present invention.
Figure 4:
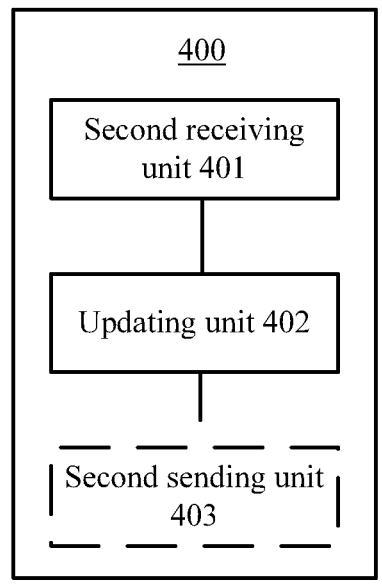
FIG. 4 is a schematic structural diagram of an apparatus for handling an address conflict according to an embodiment of the present invention.

The following describes a structure of an apparatus for handling an address conflict according to embodiments of the present invention with reference to FIG. 3 and FIG. 4.

As shown in FIG. 3, an apparatus 300 for handling an address conflict includes an acquiring unit 301, a first receiving unit 302, and a first sending unit 303. In addition, the apparatus 300 for handling an address conflict may further include a replacing unit 304.

For example, the acquiring unit 301 is configured to acquire a MAC address of an associated first node and a first auxiliary identifier.

Optionally, the acquiring unit 301 is configured to: before associating with the first node, receive a beacon frame or a probe response frame sent by the first node, where the beacon frame or the probe response frame carries the MAC address of the first node and the first auxiliary identifier; or after sending an association request frame to the first node, receive an association response frame sent by the first node, where the association response frame carries the MAC address of the first node and the first auxiliary identifier.

For example, the first receiving unit 302 is configured to receive a MAC frame that carries the first auxiliary identifier. The first sending unit 303 is configured to send an auxiliary identifier conflict report message to the first node when it is determined that the MAC frame is sent by a second node.

Optionally, the first receiving unit 302 is configured to receive the MAC frame, where the MAC frame is a beacon frame or a probe response frame; and a data section of the beacon frame or the probe response frame includes the first auxiliary identifier, and a frame header section of the beacon frame or the probe response frame includes a source MAC address. The first sending unit 303 is configured to: if the source MAC address in the frame header section of the beacon frame or the probe response frame differs from the MAC address of the first node, determine that the beacon frame or the probe response frame is sent by the second node, and send the auxiliary identifier conflict report message to the first node.

Optionally, the first receiving unit 302 is configured to receive the MAC frame, where the MAC frame is a protected frame. A source address of the MAC frame is represented by the first auxiliary identifier and the protected frame has a frame message integrity code (MIC). The first sending unit 303 is configured to: if the MIC is incorrect, determine that the MAC frame is sent by the second node, and send the auxiliary identifier conflict report message to the first node.

For example, the replacing unit 304 is configured to: after the sending an auxiliary identifier conflict report message to the first node, receive a beacon frame, an association response frame, a re-association response frame, or an auxiliary identifier update frame that is sent by the first node and carries a second auxiliary identifier, and acquires the second auxiliary identifier, so as to use the second auxiliary identifier to replace the first auxiliary identifier.

It may be known from the foregoing that, using the apparatus for handling an address conflict in this embodiment of the present invention, the following problem may be detected and resolved. An AP auxiliary identifier conflict is caused by a MAC header compression method where an auxiliary identifier is used to replace a MAC address. Therefore, smooth implementation of the MAC header compression method is ensured, thereby reducing a MAC header length and improving a channel utilization rate.

As shown in FIG. 4, an apparatus 400 for handling an address conflict includes a second receiving unit 401 and an updating unit 402.

The second receiving unit 401 is configured to receive a MAC frame, where a destination address of the MAC frame is represented by a third auxiliary identifier, and the third auxiliary identifier is used to communicate with an associated third node. The updating unit 402 is configured to determine, based on the MAC frame, that a fourth node whose auxiliary identifier is the third auxiliary identifier exists, change the third auxiliary identifier to a fourth auxiliary identifier, and inform the third node of the fourth auxiliary identifier.

Optionally, the second receiving unit 401 is configured to receive the MAC frame, where the destination address of the MAC frame is represented by the third auxiliary identifier. The MAC frame is a protected frame and the protected frame has a frame message integrity code (MIC). The updating unit 402 is configured to, if the MIC is incorrect, determine that the fourth node whose auxiliary identifier is the third auxiliary identifier exists, change the third auxiliary identifier to the fourth auxiliary identifier, and inform the third node of the fourth auxiliary identifier.

Optionally, the second receiving unit 401 is configured to receive the MAC frame, where the MAC frame is an auxiliary identifier conflict report message, and the destination address of the MAC frame is represented by the third auxiliary identifier. The updating unit 402 is configured to determine, based on the auxiliary identifier conflict report message, that the fourth node whose auxiliary identifier is the third auxiliary identifier exists.

In addition, the apparatus 400 for handling an address conflict may further include a second sending unit 403.

The second sending unit 403 is configured to send a MAC frame that carries the third auxiliary identifier. The MAC frame is a beacon frame or a probe response frame and the third auxiliary identifier is included in a data section of the MAC frame.

Alternatively, the second sending unit 403 is configured to send the MAC frame that carries the third auxiliary identifier, where the MAC frame is a protected frame, and the protected frame has a frame message integrity code (MIC); and the third auxiliary identifier is included in a frame header section of the MAC frame, and represents a source address of the MAC frame.

Alternatively, the second sending unit 403 is configured to send an association response frame or a re-association response frame whose data section includes the third auxiliary identifier.

Optionally, the second receiving unit 401 may further be configured to receive an association request frame or a re-association request frame sent by the third node.

Optionally, the updating unit 402 is configured to determine, based on the MAC frame, that the fourth node whose auxiliary identifier is the third auxiliary identifier exists, change the third auxiliary identifier to the fourth auxiliary identifier, and inform the third node of the fourth auxiliary identifier using a beacon frame or an auxiliary identifier update frame.

It may be known from the foregoing that, using the apparatus for handling an address conflict in this embodiment of the present invention, the following problem may be detected and resolved. An AP auxiliary identifier conflict is caused by a MAC header compression method where an auxiliary identifier is used to replace a MAC address. Therefore, smooth implementation of the MAC header compression method is ensured, thereby reducing a MAC header length and improving a channel utilization rate.

Generally speaking, the apparatus 300 for handling an address conflict may be configured in an STA and the apparatus 400 for handling an address conflict may be configured in an AP.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely a logical function division and there may be other divisions in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of the present invention essentially, or the part contributing to the prior art, or a part of the technical solutions may be implemented in a form of a software product. The software product is stored in a storage medium, and includes several instructions for instructing a computer device (which may be a personal computer, a server, or a network device) to perform all or a part of the steps of the methods described in the embodiments of the present invention. The foregoing storage medium includes any medium that can store program code, such as a universal serial bus (USB) flash drive, a removable hard disk, a read-only memory (ROM), a random access memory (RAM), a magnetic disk, or an optical disc.

The foregoing descriptions are merely specific implementation manners of the present invention, but are not intended to limit the protection scope of the present invention. Any variation or replacement readily figured out by persons skilled in the art within the technical scope disclosed in the present invention shall fall within the protection scope of the present invention. Therefore, the protection scope of the present invention shall be subject to the protection scope of the claims.

What is claimed is:

1. A method for handling an address conflict, comprising:
   acquiring a first media access control (MAC) address and a first auxiliary identifier from a first node, wherein the MAC address is a first identifier associated with the first node, and wherein the first auxiliary identifier is a second identifier associated with the first node;
   receiving a MAC frame that comprising the first auxiliary identifier from a second node, wherein the first auxiliary identifier is also associated with the second node, and wherein a second MAC address is a third identifier associated with the second node; and
   sending an auxiliary identifier conflict report message to the first node when the MAC frame is received from the second node.

2. The method according to claim 1, wherein the MAC frame is a beacon frame or a probe response frame, wherein a data section of the beacon frame or the probe response frame comprises the first auxiliary identifier, wherein a frame header section of the beacon frame or the probe response frame comprises the second MAC address, and wherein sending the auxiliary identifier conflict report message to the first node when the MAC frame received from the second node comprises:
   determining that the beacon frame or the probe response frame is sent by the second node when the second MAC address in a frame header section of the beacon frame or the probe response frame differs from the first MAC address of the first node; and
   sending the auxiliary identifier conflict report message to the first node.

3. The method according to claim 1, wherein the MAC frame is a protected frame, wherein the first MAC address is a source address of the MAC frame, wherein the first MAC address is represented by the first auxiliary identifier, wherein the protected frame has a frame message integrity code (MIC), and wherein sending the auxiliary identifier conflict report message to the first node when the MAC frame is received from the second node comprises:
   determining that the MAC frame is sent by the second node when the MIC is incorrect; and
   sending the auxiliary identifier conflict report message to the first node.

4. The method according to claim 1, wherein the MAC frame is a beacon frame or a probe response frame, wherein acquiring the first MAC address and the first auxiliary identifier comprises receiving the beacon frame or the probe response frame from the first node before associating with the first node, wherein a data section of the beacon frame or the probe response frame comprises the first auxiliary identifier, and wherein a frame header section of the beacon frame or the probe response frame comprises the first MAC address of the first node.

5. The method according to claim 1, wherein acquiring the first MAC address and the first auxiliary identifier comprises receiving an association response frame from the first node after sending an association request frame to the first node, wherein a data section of the association response frame comprises the first auxiliary identifier, and wherein a frame header section of the association response frame comprises the first MAC address of the first node.

6. The method according to claim 1, wherein after sending the auxiliary identifier conflict report message to the first node, the method further comprises:
   receiving at least one of a beacon frame, an association response frame, a re-association response frame, and an auxiliary identifier update frame comprising a second auxiliary identifier from the first node; and
   acquiring the second auxiliary identifier to use the second auxiliary identifier to replace the first auxiliary identifier.

7. The method according to claim 1, wherein a header section of the MAC frame comprises a second MAC address, and wherein a data section of the MAC frame comprises the first auxiliary identifier.

8. A method for handling an address conflict, comprising:
   receiving a first media access control (MAC) frame comprising a first MAC address and a first auxiliary identifier from a first node, wherein the first MAC address is a first identifier associated with a destination address of the MAC frame, wherein the first auxiliary identifier is a second identifier associated with the first node, wherein the first auxiliary identifier is used to communicate with the first node and wherein a second MAC address is a third identifier associated with the second node;
   changing the first auxiliary identifier to a second auxiliary identifier when a MAC frame comprising the first auxiliary identifier is received from a second node; and
   informing the first node of the second auxiliary identifier.

9. The method according to claim 8, wherein the first MAC frame is a protected frame, wherein the protected frame has a frame message integrity code (MIC), and wherein the first auxiliary identifier is changed to the second auxiliary identifier when the MIC is incorrect.

10. The method according to claim 8, wherein the fir MAC frame is an auxiliary identifier conflict report message, and wherein the method further comprises determining, based on the auxiliary identifier conflict report message, that the first node and the second node are both associated with the same first auxiliary identifier.

11. The method according to claim 8, wherein before receiving the MAC frame, the method further comprises sending an earlier MAC frame that comprises the first auxiliary identifier, and wherein the earlier MAC frame is a beacon frame or a probe response frame.

12. The method according to claim 8, wherein before receiving the MAC frame, the method further comprises sending an earlier MAC frame that comprises the first auxiliary identifier, wherein the earlier MAC frame is a protected frame, wherein the protected frame has a frame message integrity code (MIC), and wherein the first auxiliary identifier is part of a frame header section of the earlier MAC frame to represent a source address of the earlier MAC frame.

13. The method according to claim 8, wherein before receiving the MAC frame, the method further comprises:
   receiving an association request frame or a re-association request frame sent by the third first node; and
   sending an association response frame or a re-association response frame comprising the second auxiliary identifier in a data section of the association response frame or the re-association response frame.

14. The method according to claim 8, wherein informing the first node of the second auxiliary identifier comprises informing, using a beacon frame or an auxiliary identifier update frame, the first node of the second auxiliary identifier.

15. An apparatus for handling an address conflict, comprising:
   a processor configured to acquire a first media access control (MAC) address and a first auxiliary identifier from a first node, wherein the first MAC address is a first identifier associated with the first node, and wherein the first auxiliary identifier is a second identifier associated with the first node;

a receiver coupled to the processor and configured to receive a MAC frame comprising the first auxiliary identifier from a second node, wherein the first auxiliary identifier is also associated with the second node, and wherein a second MAC address is a third identifier associated with the second node; and a transmitter coupled to the processor and configured to send an auxiliary identifier conflict report message to the first node when determining the MAC frame is received from the second node.

16. The apparatus according to claim 15, wherein the MAC frame is a beacon frame or a probe response frame, wherein a data section of the beacon frame or the probe response frame comprises the first auxiliary identifier, wherein a frame header section of the beacon frame or the probe response frame comprises the second MAC address, and wherein the processor is further configured to determine that the beacon frame or the probe response frame is sent by the second node when the second MAC address part of a frame header section of the beacon frame or the probe response frame differs from the first MAC address of the first node, and wherein the transmitter is further configured to send the auxiliary identifier conflict report message to the first node.

17. The apparatus according to claim 16, wherein the MAC frame is a protected frame, wherein the first MAC address is a source address of the MAC frame, wherein the first MAC address is represented by the first auxiliary identifier, wherein the protected frame has a frame message integrity code (MIC), and wherein the transmitter is further configured to:

determine that the MAC frame is sent by the second node when the MIC is incorrect; and send the auxiliary identifier conflict report message to the first node.

18. The apparatus according to claim 15, wherein the processor is further configured to receive the beacon frame or the probe response frame from the first node before associating with the first node, wherein a data section of the beacon frame or the probe response frame comprises the first auxiliary identifier, and wherein a frame header section of the beacon frame or the probe response frame comprises the first MAC address of the first node.

19. The apparatus according to claim 15, wherein the processor is further configured to receive an association response frame from the first node after sending an association request frame to the first node, wherein a data section of the association response frame comprises the first auxiliary identifier, and wherein a frame header section of the association response frame comprises the first MAC address of the first node.

20. The apparatus according to claim 15, wherein the processor is further configured to:

receive at least one of a beacon frame, an association response frame, a re-association response frame, and an auxiliary identifier update frame comprising a second auxiliary identifier from the first node after the auxiliary identifier conflict report message is sent to the first node; and acquire the second auxiliary identifier to use the second auxiliary identifier to replace the first auxiliary identifier.

21. An apparatus for handling an address conflict, comprising:

a processor configured to receive a MAC frame comprising a first MAC address and a first auxiliary identifier, wherein the first MAC address is a first identifier associated with a destination address of the MAC frame, wherein the first auxiliary identifier is a second identifier associated with the first node, wherein the first auxiliary identifier is used to communicate with the first node, wherein the processor configured to change the first auxiliary identifier to a second auxiliary identifier when a second MAC frame comprising the first auxiliary identifier is received from a second node, and wherein a second MAC address is a third identifier associated with the second node; and a transmitter coupled to the processor and configured to inform the first node of the second auxiliary identifier.

22. The apparatus according to claim 21, wherein the MAC frame is a protected frame, wherein the protected frame has a frame message integrity code (MIC), and wherein the first auxiliary identifier is changed to the second auxiliary identifier when the MIC is incorrect.

23. The apparatus according to claim 21, wherein the first MAC frame is an auxiliary identifier conflict report message, and wherein the processor is further configured to determine, based on the auxiliary identifier conflict report message, that the first node and the second node are both associated with the same first auxiliary identifier-exists.

24. The apparatus according to claim 21, wherein the transmitter is further configured to send a third MAC frame that comprises the first auxiliary identifier, wherein the third MAC frame is a beacon frame or a probe response frame, and wherein the first auxiliary identifier is part of a data section of the third MAC frame.

25. The apparatus according to claim 21, wherein the transmitter is further configured to send a third MAC frame that comprises the first auxiliary identifier, wherein the third MAC frame is a protected frame, wherein the protected frame has a frame message integrity code (MIC), and wherein the first auxiliary identifier is part of a frame header section of the third MAC frame to represent a source address of the third MAC frame.

26. The apparatus according to claim 21, wherein the transmitter is further configured to send an association response frame or a re-association response frame comprising the fit auxiliary identifier, and wherein the receiver is further configured to receive an association request frame or a re-association request frame sent by the first node.

* * * * *